US009880001B2

(12) United States Patent
Tang et al.

(10) Patent No.: US 9,880,001 B2
(45) Date of Patent: Jan. 30, 2018

(54) METHOD AND SYSTEM FOR MULTI-LAYER POSITIONING SYSTEM

(71) Applicant: NANYANG POLYTECHNIC, Singapore (SG)

(72) Inventors: Yew Fei Tang, Singapore (SG); Siew Leong Kan, Singapore (SG)

(73) Assignee: NANYANG POLYTECHNIC, Singapore (SG)

( * ) Notice: Subject to any disclaimer, the term of this patent is extended or adjusted under 35 U.S.C. 154(b) by 0 days.

(21) Appl. No.: 15/127,504

(22) PCT Filed: Mar. 3, 2015

(86) PCT No.: PCT/SG2015/050028
§ 371 (c)(1),
(2) Date: Sep. 20, 2016

(87) PCT Pub. No.: WO2015/142286
PCT Pub. Date: Sep. 24, 2015

(65) Prior Publication Data
US 2017/0131101 A1 May 11, 2017

(30) Foreign Application Priority Data

Mar. 20, 2014 (SG) .......................... 10201400810V

(51) Int. Cl.
*G01C 21/10* (2006.01)
*G01C 21/00* (2006.01)

(52) U.S. Cl.
CPC .................................. *G01C 21/005* (2013.01)

(58) Field of Classification Search
CPC .................................................... G01C 21/005
USPC ........................................................... 701/506
See application file for complete search history.

(56) References Cited

U.S. PATENT DOCUMENTS

| 7,589,672 | B2* | 9/2009 | Malinovskiy | ........... G01S 13/87 |
| | | | | 342/357.4 |
| 2009/0150074 | A1* | 6/2009 | Vanderwerf | ............ G01S 19/20 |
| | | | | 701/469 |
| 2013/0021199 | A1* | 1/2013 | Fix | ........................ G01S 5/0263 |
| | | | | 342/357.43 |

(Continued)

FOREIGN PATENT DOCUMENTS

| JP | 2008122131 A | 5/2008 |
| KR | 20130091688 A | 8/2013 |

(Continued)

OTHER PUBLICATIONS

Jun. 15, 2015—International Search Report—PCT/SG2015/050028.

*Primary Examiner* — Muhammad Shafi
(74) *Attorney, Agent, or Firm* — Banner & Witcoff, Ltd.

(57) ABSTRACT

This invention relates to a navigation system for integrating a number of positioning receivers to obtain a final position. The navigation system comprises an operation and control module and a unifying module. The operation and control module is being configured to receive a location data from each of the positioning receivers and transmits the location data to the unifying module. The unifying module will then determine the final position based on a statistical model. In particular, the statistical model uses normal distribution to determine the final position. This final position is then displayed on the display of the navigation system.

15 Claims, 10 Drawing Sheets

(56) References Cited

U.S. PATENT DOCUMENTS

2013/0201055 A1* 8/2013 Hadef .................. G01S 19/23
　　　　　　　　　　　　　　　　　342/357.25

FOREIGN PATENT DOCUMENTS

| SG | 120957 A1 | 4/2006 |
| SG | 144757 A1 | 8/2008 |

* cited by examiner

METHOD AND SYSTEM FOR MULTI-LAYER POSITIONING SYSTEM

CROSS-REFERENCE TO RELATED APPLICATIONS

This application is a U.S. National Stage application under 35 U.S.C. § 371 of International Application PCT/SG2015/050028 (published as WO 2015/142286 A1), filed Mar. 3, 2015, which claims priority to Application SG 10201400810V, filed Mar. 20, 2014. Benefit of the filing date of each of these prior applications is hereby claimed. Each of these prior applications is hereby incorporated by reference in its entirety.

FIELD OF THE INVENTION

This invention relates to a system and a method of determining a location of a positioning device. More particularly, this invention relates to a system and a method of determining a location based on historical location information and/or location information received from multiple positioning receivers. Still more particularly, this invention relates to integrating multiple positioning receivers, predict next possible location if device is moving, and adapt to applications and operating environments to obtain a location of a positioning device.

PRIOR ART

Traditionally, wireless positioning systems to locate objects and human are carried out through the use of one single localisation technique. The accuracy and robustness of these positioning systems are affected much by the change of operating environments and application scenarios. Some advanced algorithms, though support multiple techniques, are typically just switching from one default positioning system to another available positioning system. These techniques provide some assurance in robustness in tracking the object position when object moves, but still unable to improve significantly the accuracy of its position.

Hence, those skilled in the art are striving to provide an improved system that provides a more accurate location reading.

SUMMARY OF THE INVENTION

The above and other problems are solved and an advance in the art is made by a navigation system in accordance with this invention. A first advantage of a navigation system in accordance with this invention is that the navigation system provides a more accurate location of the navigation system which employs a number of positioning receivers. A second advantage of a navigation system in accordance with this invention is that the navigation system may be implemented on existing infrastructures and technologies. Hence, this avoids incurring additional cost for building a new system.

In accordance with an aspect of the invention, a navigation system for integrating a number of positioning receivers to obtain a final position is provided in the following manner. The navigation system comprises an operation and control module and a unifying module. The operation and control module is being configured to receive a location data from each of the positioning receivers. The unifying module is being configured to perform the following steps in response to receiving the location data of the positioning receivers from the operation and control module:

normalising the location data of each of the positioning receivers;

determining an accuracy for each of the positioning receivers based on the location data of each of the positioning receivers with the following expression, $$\text{Acc}(X_{\vec{x},p}^{i}) = \sigma_{\vec{x}}^{i}$$

where p=1, 2, 3, $\vec{x}=(x_1, x_2, x_3)$ is the latitude, longitude and altitude of a point, $X_{\vec{x}}^{i}=(X_{\vec{x},1}^{i}, X_{\vec{x},2}^{i}, X_{\vec{x},3}^{i})$ is the latitude, longitude and altitude by the $i^{th}$ positioning receiver and $\sigma_{\vec{x}}^{i}$ is the accuracy;

applying a normal distribution for each of the location data with the following expression, $$X_{\vec{x},p} \sim N\left(x_{\vec{x},p}, \sqrt{\sum_{i=1}^{n} \frac{\hat{\alpha}_{\vec{x}}^{i}}{\hat{\theta}^2}}\right)$$

where, $x_{\vec{x},1}^{\vec{x},1}$, $x^{\vec{x},2}$, $x_{\vec{x},3}^{\vec{x}}$, are the calculated latitude, longitude and altitude, determining the final position based on the accuracy of each of the location data with the following expression, $$\sum_{i=1}^{n} \frac{\hat{\alpha}_{\vec{x}}^{j}}{\hat{\theta}^2} \leq \sigma_{\vec{x}}^{i,2}$$

for i=1, 2, . . . , n.; and transmitting the final location to the operation and control module.

In turn, the operation and control module displays the final position on a display of the navigation system in response to receiving the final location from the unifying module.

In accordance with an embodiment of this invention, the operation and control module is further configured to receive a subsequent location data from each of the positioning receivers. The location data is then compared with the subsequent location data. The operation and control module then determines whether the navigation system is stationary or moving based on displacement between the location data and the subsequent location data.

In accordance with an embodiment of this invention, the navigation system further comprises an adaptive module and a predictive module. The operation and control module is configured to transmit the final location to the adaptive module and the predictive module in response to the navigation system being determined to be moving. In turn, the predictive module determines at least one estimated next location while the adaptive module determines an estimated next location. These estimated next locations are transmitted to the unifying module. In response to receiving the estimated next locations and the subsequent location data, the unifying module performs the following steps:

normalising the subsequent location data of each of the positioning receivers, the estimated next locations from the predictive module and the adaptive module;

determining an accuracy for each of the positioning receivers and the estimated next locations with the following expression, $$\text{Acc}(X_{\vec{x},p}^{i}) = \sigma_{\vec{x}}^{i}$$

where p=1, 2, 3, $\vec{x}=(x_1, x_2, x_3)$ is the latitude, longitude and altitude of a point, $X_{\vec{x}}^i=(X_{\vec{x},1}^i, X_{\vec{x},2}^i, X_{\vec{x},3}^i)$ is the latitude, longitude and altitude by the $i^{th}$ positioning receiver and estimated next locations and $\sigma_{\vec{x}}^i$ is the accuracy;

applying a normal distribution for each of the subsequent location data and the estimated next locations with the following expression, $$X_{\vec{x},p} \sim N\left(x_{\vec{x},p}, \sqrt{\sum_{i=1}^{n} \frac{\hat{\alpha}_{\vec{x}}^i}{\hat{\theta}^2}}\right)$$

where, $x_{\vec{x},1}^{\rightarrow}$, $x^{\vec{x},2}$, $x_{\vec{x},3}^{\rightarrow}$, are the calculated latitude, longitude and altitude, determining an updated final position based on said the accuracy of each of the location data and the estimated next locations with the following expression, $$\sum_{i=1}^{n} \frac{\hat{\alpha}_{\vec{x}}^i}{\hat{\theta}^2} \le \sigma_{\vec{x}}^{j,2}$$

for i=1, 2, . . . , n.; and transmitting the updated final location to the operation and control module. In response to receiving the updated final location, the operation and control module displays the updated final position on the display of said navigation system.

BRIEF DESCRIPTION OF THE DRAWINGS

The above and other features and advantages in accordance with this invention are described in the following detailed description and are shown in the following drawings.

DETAILED DESCRIPTION

This invention relates to a system and a method of determining a location of a positioning device. More particularly, this invention relates to a system and a method of determining a location based on historical location information and/or location information received from multiple positioning receivers. Still more particularly, this invention relates to integrating multiple positioning receivers, predict next possible location if device is moving, and adapt to applications and operating environments to obtain a location of a positioning device.

It is envisioned that the positioning device in accordance with embodiments of this invention may be used for determining an accurate location based on location information received from multiple positioning receivers. In particular, the positioning device provides a single platform that is capable of unifying and optimising statistically all available location estimates from various positioning receivers, predicting the next possible position of moving objects based on a statistical model, and adapting to a set of constraints such as changes in operating environments and limitation of positioning receivers.

Briefly, the positioning device or navigation system receives location information from multiple positioning receivers and determines a location of the positioning device based on statistical formula. Subsequently, the positioning device predicts the next location based on historical data. Further details of the positioning device will be described as follows.

Figure 1:
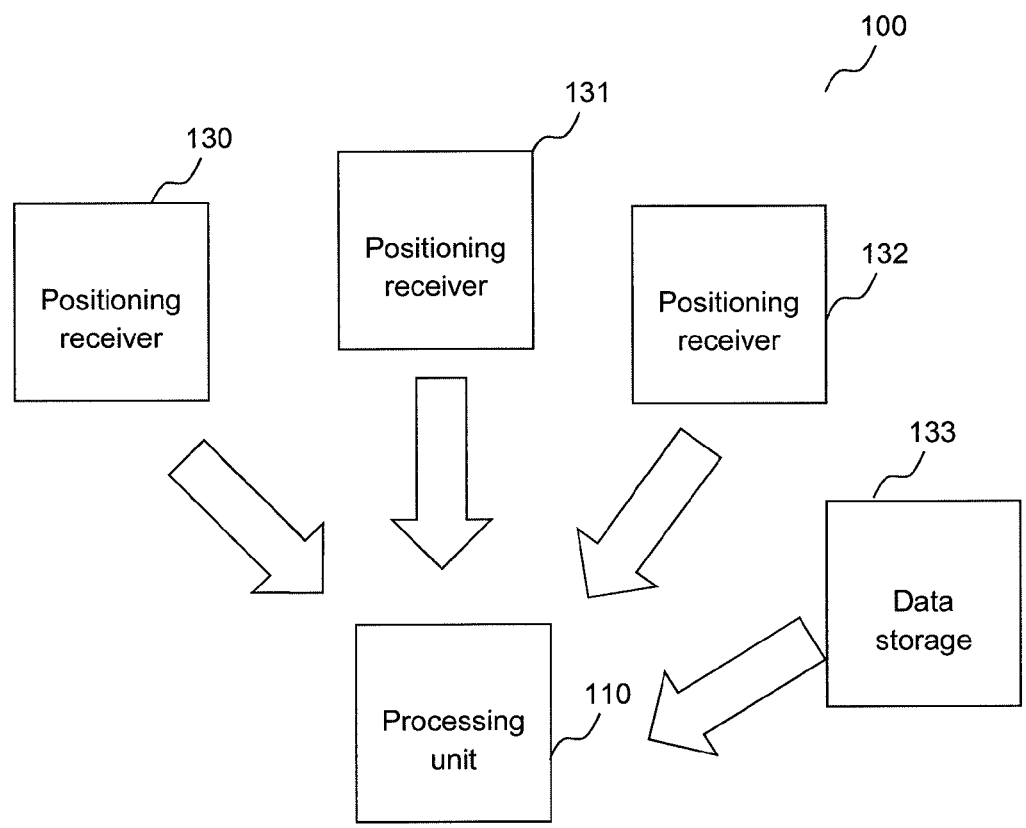
FIG. 1 illustrating a system in accordance with an embodiment of this invention.

FIG. 1 illustrates the components of a positioning device 100. Positioning device 100 includes a processing unit 110, data storage 133, and a number of positioning receivers 130-132.

Processing unit 110 is a system that executes instructions to perform the application described below in accordance with this invention. Processing unit 110 is communicatively connected to positioning receivers 130-132 to receive location information from each of the positioning receivers 130-132. Processing unit 110 is also communicatively connected to data storage 133 to access historical location information from data storage 133.

Positioning receivers 130-132 are navigation system that is capable of providing the location information. Some positing receivers include, but not limited to Global Positioning System (GPS) receiver, Assisted Global Positioning System (AGPS), and Wi-Fi Positioning System. Although only three positioning receivers 130-132 are provided in FIG. 1, one skilled in the art will recognise that other number of positioning receivers may be implemented without departing from the invention.

Data storage 133 is a storage device that stores historical location information together with templates, i.e. environmental templates that map location data to information on environmental parameters such as enclose area (indoor), open area (outdoor); weather templates that map location data to weather condition (rain, clear sky, etc.); route templates that map location data to user preferred route or repetitive route taken; and application templates that map location data to types of applications executed when such historical location information is obtained. The historical or real-time location data obtained from the methods and systems described in Singapore Patent No. 120957 and Singapore Patent No. 144757 will also be stored in data storage 133. The two Singapore patents disclose a system and method for tracking mobile devices and its neighbouring mobile nodes. One skilled in the art will recognise the data storage 133 may also be one of the components processing unit 110 without departing from the invention.

Figure 2:
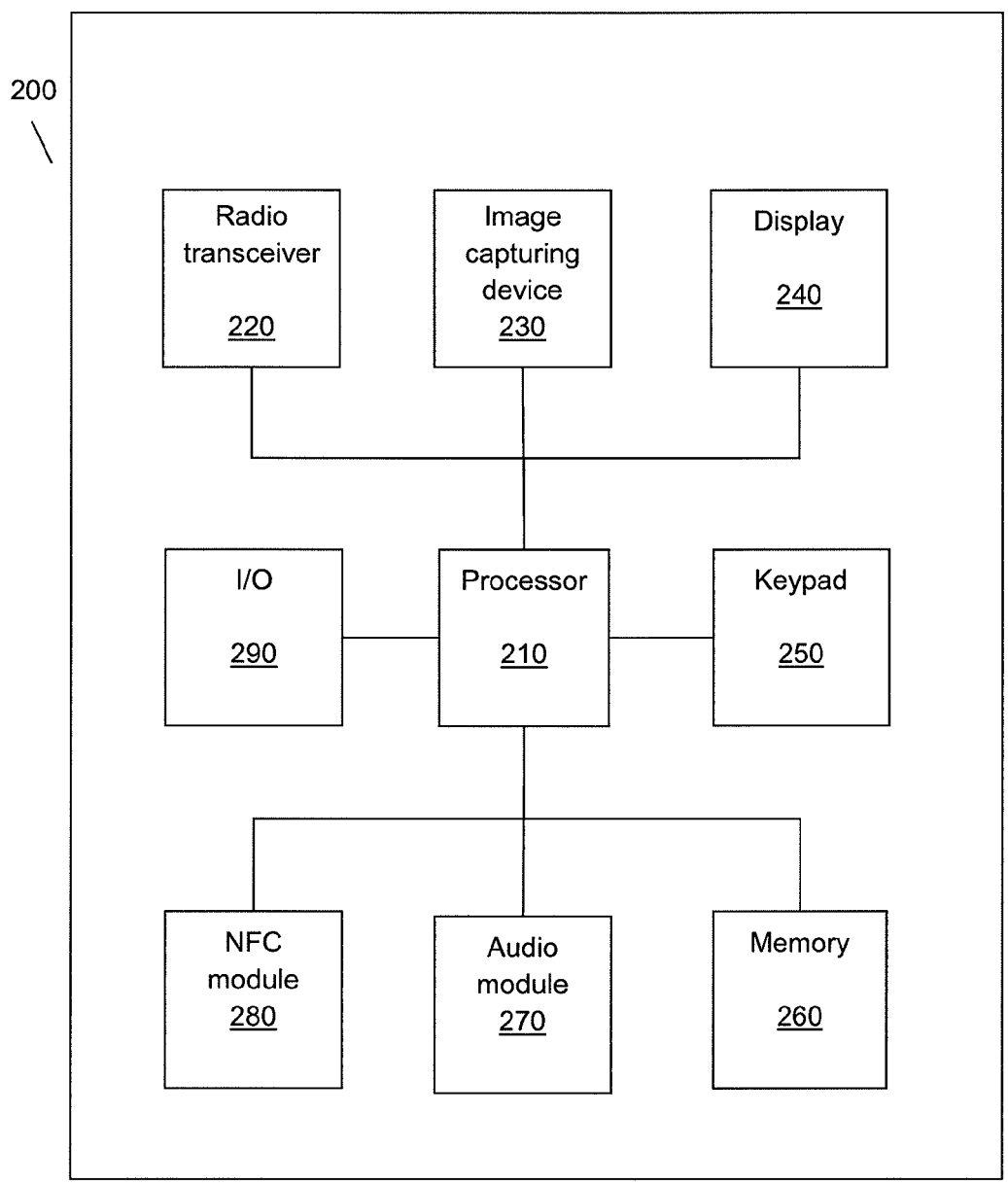
FIG. 2 illustrating a representative processing system in accordance with embodiments of this invention.

FIG. 2 illustrates an example of a processing system 200 in the processing unit 110. Processing system 200 represents the processing systems in the processing unit 110 that execute instructions to perform the processes described below in accordance with embodiments of this invention. One skilled in the art will recognize that the instructions may be stored and/or performed as hardware, firmware, or software without departing from this invention. Further, one skilled in the art will recognize that the exact configuration of each processing system may be different and the exact configuration of the processing system executing processes in accordance with this invention may vary and processing system 200 shown in FIG. 2 is provided by way of example only.

Processing system 200 includes a processor 210, a radio transceiver 220, an image capturing device 230, a display 240, a keypad 250, a memory 260, an audio module 270, a Near Field Communication (NFC) module 280, and an I/O device 290.

The radio transceiver 220, image capturing device 230, display 240, keypad 250, memory 260, audio module 270, NFC module 280, I/O device 290 and any number of other peripheral devices connect to processor 210 are to exchange data with processor 210 for use in applications being executed by processor 210.

The radio transceiver 220 is connected to an antenna which is configured to transmit outgoing voice and data signals and receive incoming voice and data signals over a radio communication channel. The radio communication channel can be a digital radio communication channel such as a CDMA, GSM or LTE channels that employs both voice and data messages in conventional techniques.

The image capturing device 230 is any device capable of capturing still and/or moving images such as complementary metal-oxide semiconductor (CMOS) or charge-coupled sensor (CCD) type cameras. The display 240 receives display data from processor 210 and displays images on a screen for a user to see. The display 240 may be a liquid crystal display (LCD) or organic light-emitting diode (OLED) display. The keypad 250 receives user input and transmits the input to processor 210. In some embodiments, the display 240 may be a touch sensitive surface that functions as a keypad to receive user input.

The memory 260 is a device that transmits and receives data to and from processor 210 for storing data. The audio module 270 may include a microphone, an earpiece and a headset. A microphone is a device that transmits audio data to processor 210. An earpiece is a device that receives audio data from the processor. The headset is a device that transmits and receives audio data to and from the processor 210. The NFC module 280 is a module that allows processing unit 110 to establish radio communication with another similar device by touching them together or by bringing the devices within a close proximity.

Other peripheral devices that may be connected to processor 210 include a Bluetooth transceiver, a Wi-Fi transceiver, a Global Positioning System (GPS), a RFID transceiver, an ultra wideband transceiver and other positioning receivers.

The processor 210 is a processor, microprocessor, or any combination of processors and microprocessors that execute instructions to perform the processes in accordance with the present invention. The processor has the capability to execute various application programs that are stored in the memory 260. These application programs can receive inputs from the user via the display 240 having a touch sensitive surface or directly from a keypad 250. Some application programs stored in the memory 260 that can be performed by the processor 210 are application programs developed for iPhone, Android, Windows Mobile, Blackberry or other mobile platforms.

Figure 3:
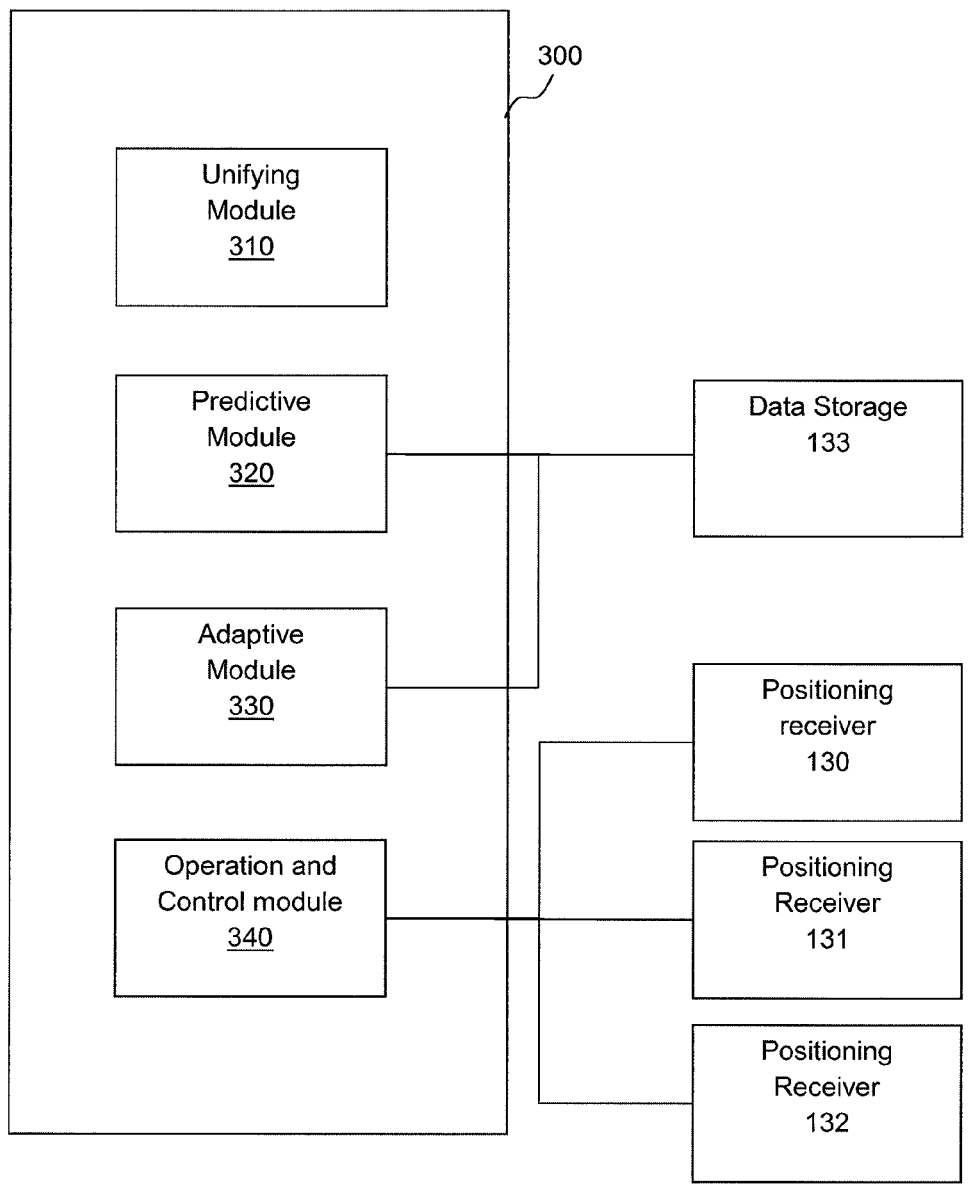
FIG. 3 illustrating the modules of a program being executed by the system in accordance with an embodiment of this invention.

FIG. 3 shows a program 300 stored in memory 260 in processing unit 110 for performing the processes in accordance with the present invention. Program 300 includes a unifying module 310, a predictive module 320, an adaptive module 330, an operation and control module 340.

The unifying module 310 is a module that receives a number of location information and determines a final location. The unifying module 310 unifies and optimises all available locations received by the unifying module 310. The accuracy would be calculated independently and their results would be combined based on a statistical model. The unified result produces a position with higher precision statistically. This is because the algorithm takes the variation of the results from each of the location information received and approximates with different degrees to arrive at the final value. In particular the unifying module 310 receives location information from positioning receivers 130-132 or location information from the predictive module 320 or adaptive module 330 and performs a calculation based on statistical model to determine a location based on the location information received. Further details of the processes of the unifying module 310 will be described below with reference to FIG. 5.

The predictive module 320 is a module for predicting the next location. The predictive module 320 predicts the next location based on present and historical location data, environmental data as well as human experience if available. The historical location data can be parameters such as velocity, present location and past results, human experience, etc. that may provide a fairly accurate prediction on where the next position would be. Further details of the processes of the predictive module 320 will be described below with reference to FIG. 7.

The adaptive module 330 is a module that determines an estimated location based on terrain and environmental information. As estimated location information will be determined based on coordinated and environmental information. This location information would be input into the unifying module 310 to adjust the final location. For example, the speed of driving a vehicle in summer would be slower than driving in winter. Therefore, if the estimated position information is faster in winter, the system would consider taking a lower range of the estimated position. However, if five consecutive of higher value is estimated, the higher value would be taken into account. This would reflect the environmental elements and non-localisation information to adjust the final location thereby improving the accuracy of the final location with respect to the actual location. Further details of the processes of the adaptive module 330 will be described below with reference to FIG. 8.

The operation and control module 340 is a module that controls the data being transmitted and received among the various modules, data being received from the positioning receivers 130-132, data to be transmitted to display 240, data received from components of the processing unit 110 such as keypad 250 or display 240 that is a touch sensitive surface that functions as a keypad to receive user input. Further details of the processes of the operation and control module 340 will be described below with reference to FIG. 4.

Figure 4:
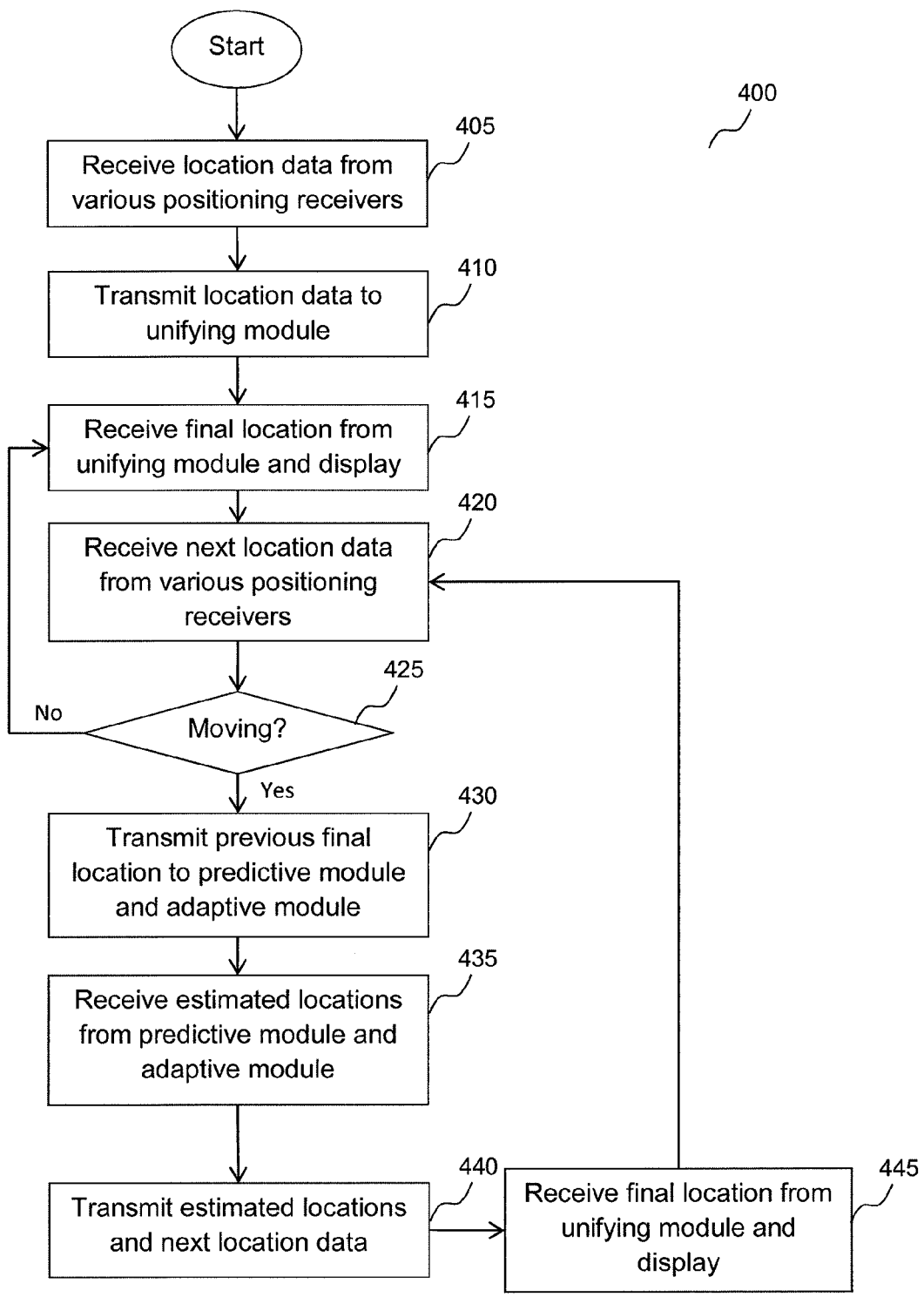
FIG. 4 illustrating a flow diagram of a process performed by the operation and control module in accordance with an embodiment of this invention.

FIG. 4 illustrates a flow diagram of process 400 performed by the processor in processing unit 110 in accordance with an embodiment of this invention. Process 400 is a process being executed by the operation and control module 340. Process 400 begins with step 405 by receiving location data from various positioning receivers. The location data includes latitude (y), longitude (x) and altitude (z) readings from each of the positioning receivers. The location data is then transmitted to the unifying module in step 410. Further details of unifying of the location data to derive the final location will be described below with reference to FIG. 5.

In step 415, process 400 receives the final location from the unifying module 310 and display the final location on the display 240. In particular, the final location is plotted onto the map using the longitude, latitude and altitude received from the unifying module 310.

In step 420, process 400 receives the next location data from various positioning receivers. In step 425, process 400 determines if the next location data is similar to the location data received in step 405. This is to determine if the object in which position receivers are installed remain stationary or has moved to a new location. The process to determine if the object is stationary or has moved to a new location may be performed in the following manner. The next location data is compared with the previous location data. The object is considered moved if: 1) the displacement between new y and previous y is greater than a predetermined value, 2) the displacement between new x and previous x is greater than a predetermined value, or 3) the displacement between new z and previous z is greater than a predetermined value. The choice of the predetermined value is dependent on the accuracy of each of the positioning receivers and is therefore left as a design choice to those skilled in the art.

If process 400 determines that the object has moved in step 425, process 400 proceeds to step 430. Otherwise, process 400 repeats from step 415 and uses the previous final location and display the final location on display 240.

In step 430, process 400 transmits the previous final location to predictive module 320 and adaptive module 330 to determine an estimated location.

In step 435, process 400 receives the estimated location data from predictive module 320 and adaptive module 330.

Subsequently, in step 440, process 400 transmits the estimated location data from the predictive module 320, adaptive module 330 and the next location data from various positioning receivers 130-132 to the unifying module 310. The unifying module 310 will determine an updated final location.

In step 445, process 400 receives the updated final location from the unifying module 310 and displays the updated final location on display 240. Process 400 then repeats from step 420 to receive the next location data from various positioning receivers and determine whether the object us still moving.

Figure 5:
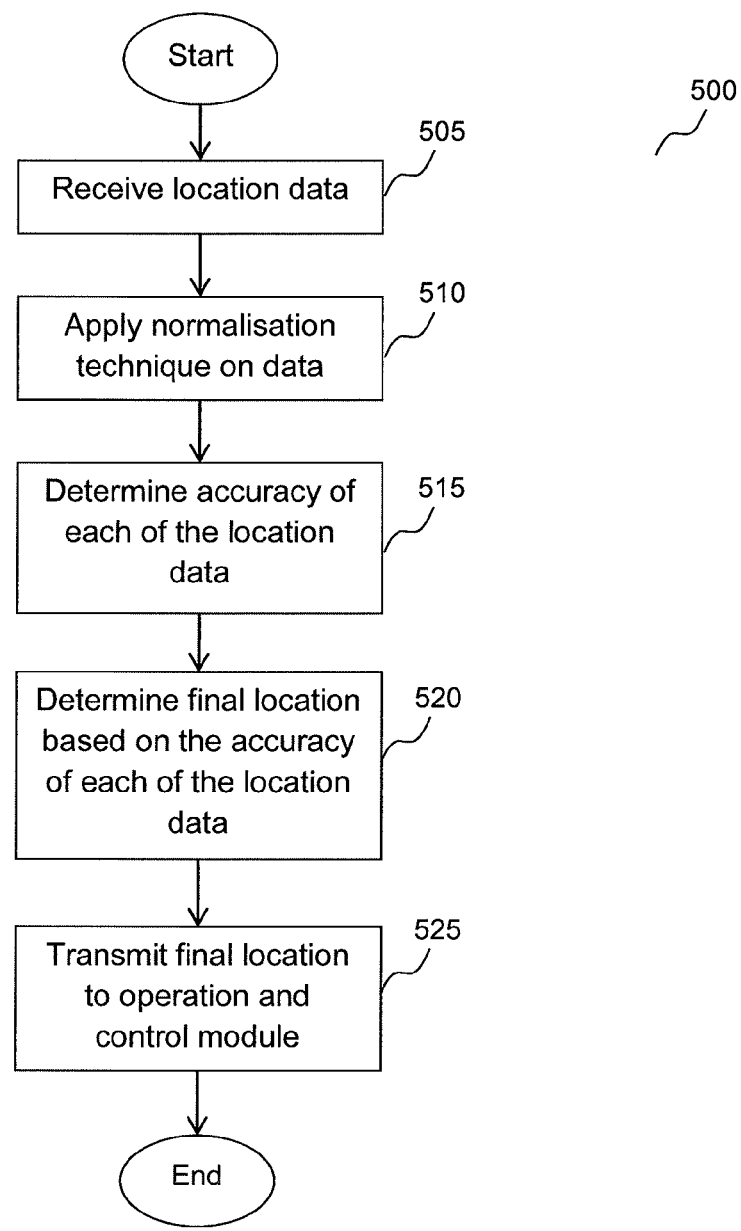
FIG. 5 illustrating a flow diagram of a process performed by the unifying module in accordance with an embodiment of this invention.

FIG. 5 illustrates a flow diagram of process 500 performed by the processor in processing unit 110 in accordance with an embodiment of this invention. Process 500 is a process being executed by the unifying module 310. Process 500 begins with step 505 by receiving location data from various positioning receivers and estimated location data from the predictive module and/or adaptive module.

From step 510 to step 520, process 500 applies a statistical model to the location data. The statistical model is a Gaussian distribution function being applied in the following manner. In step 510, the location data provided by each of the positioning receivers and estimated location from the predictive module and/or adaptive module would be normalised. The normalisation is performed using conventional statistical model to make the data information comparable across all inputs.

In step 515, the accuracy for each of the location data (Equations 1-5) is determined.

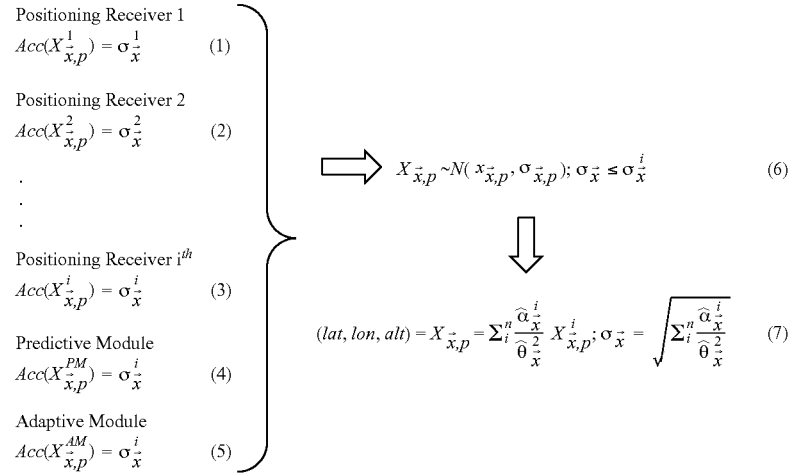

Positioning Receiver 1
$$Acc(X^1_{\vec{x},p}) = \sigma^1_{\vec{x}} \quad (1)$$

Positioning Receiver 2
$$Acc(X^2_{\vec{x},p}) = \sigma^2_{\vec{x}} \quad (2)$$

.
.
.

Positioning Receiver $i^{th}$
$$Acc(X^i_{\vec{x},p}) = \sigma^i_{\vec{x}} \quad (3)$$

Predictive Module
$$Acc(X^{PM}_{\vec{x},p}) = \sigma^i_{\vec{x}} \quad (4)$$

Adaptive Module
$$Acc(X^{AM}_{\vec{x},p}) = \sigma^i_{\vec{x}} \quad (5)$$

$$X_{\vec{x},p} \sim N(x_{\vec{x},p}, \sigma_{\vec{x},p}); \sigma_{\vec{x}} \leq \sigma^i_{\vec{x}} \quad (6)$$

$$(lat, lon, alt) = X_{\vec{x},p} = \sum_i^n \frac{\widehat{\alpha^i_{\vec{x}}}}{\widehat{\theta^2_{\vec{x}}}} X^i_{\vec{x},p}; \sigma_{\vec{x}} = \sqrt{\sum_i^n \frac{\widehat{\alpha^i_{\vec{x}}}}{\widehat{\theta^2_{\vec{x}}}}} \quad (7)$$

Where p=1, 2, 3 and $\vec{x}=(x_1, x_2, x_3)$ is the actual latitude, longitude and altitude of a point. Equations 1-3 are based on location data from positioning receivers 1-$i^{th}$ and equations 4 and 5 are location data from predictive module and adaptive module respectively. Hence $X^i_{\vec{x}}=(X^i_{\vec{x},1}, X^i_{\vec{x},2}, X^i_{\vec{x},3})$ is the latitude, longitude and altitude by the $i^{th}$ positioning receiver and $\sigma^i_{\vec{x}}$ is the accuracy. For brevity, time is omitted from the equations.

The statistical model assumes that each of location data is independent and hence deriving at equation 6. The statistical model assumes that $X^i_{\vec{x},p} \sim N(x^i_{\vec{x},p}, \sigma^i_{\vec{x}})$ and the location data from each of the positioning receivers, predictive module and adaptive module are independent and represented as a Gaussian distribution. At point $\vec{x}$, $(x^1_{\vec{x},p}, x^2_{\vec{x},p}, x^3_{\vec{x},p})$ are the mean latitude, longitude and altitude readings given by the $i^{th}$ to system and the accuracy is given by $\sigma_{\vec{x}}^i$ represented as the width of the distribution.

Equation 7 is derived in the following manner. Let $\alpha_{\vec{x}}^i = (\sigma_{\vec{x}}^i)^2 = \sigma_{\vec{x}}^{i,2}$, $$\hat{\alpha}_{\vec{x}}^i = \frac{1}{\sigma_{\vec{x}}^{i,2}}$$

and $$\hat{\theta}_{\vec{x}} = \sum_{i=1}^{n} \hat{\alpha}_{\vec{x}}^i,$$

and define p=1, 2, 3

$$X_{\vec{x},p} = \sum_{i}^{n} \frac{\hat{\alpha}_{\vec{x}}^i}{\hat{\theta}_{\vec{x}}} X_{\vec{x},p}^i \quad \text{and}$$

$$x_{\vec{x},p} = \sum_{i}^{n} \frac{\hat{\alpha}_{\vec{x}}^i}{\hat{\theta}_{\vec{x}}} x_{\vec{x},p}^i$$

Note that, $x_{\vec{x},1}^{\vec{}}$, $x^{\vec{x},2}$, $x_{\vec{x},3}^{\vec{}}$, are the calculated latitude, longitude and altitude coordinates.

For each p=1, 2, 3, $X_{\vec{x},p}^{\vec{}}$ is a normal distribution, i.e.

$$X_{\vec{x},p} \sim N\left(x_{\vec{x},p}, \sqrt{\sum_{i=1}^{n} \frac{\hat{\alpha}_{\vec{x}}^i}{\hat{\theta}^2}}\right) \quad (8)$$

Equation 8 represents the location position in Gaussian distribution.

Hence, in step 520, the final location is determined through the accuracy of each of the location data as represented by equation 9.

$$\sum_{i=1}^{n} \frac{\hat{\alpha}_{\vec{x}}^i}{\hat{\theta}^2} \leq \sigma_{\vec{x}}^{i,2} \quad (9)$$

for i=1, 2, . . . , n.

The final location position and accuracy obtained from equations 8 and 9 will be transmitted to the operation and control module 340 to display the location on display 240. Process 500 ends after step 525.

The following illustrates the effectiveness of the statistical model. Since $\{X_{\vec{x},p}^i\}_{i=1}^n$ are independent normal distributions, hence $X_{\vec{x},p}^{\vec{}}$ is also a normal distribution with mean being $x_{\vec{x},p}^i$ and variance being $$\sum_{i=1}^{n} \frac{\hat{\alpha}_{\vec{x}}^i}{\hat{\theta}^2}.$$

Define $$f(\lambda_1, \ldots, \lambda_n) = \sum_{i=1}^{n} \lambda_i^2 \alpha_{\vec{x}}^i$$

Subject to the constraint that $$\sum_{i=1}^{n} \lambda_i = 1.$$

Using Lagrange multiplier, $$\lambda_i = \frac{\hat{\alpha}_{\vec{x}}^i}{\hat{\alpha}_{\vec{x}}}$$

minimizes f. In other words, $$f\left(\frac{\hat{\alpha}_{\vec{x}}^i}{\hat{\alpha}_{\vec{x}}}, \ldots, \frac{\hat{\alpha}_{\vec{x}}^n}{\hat{\alpha}_{\vec{x}}}\right) \leq \alpha_{\vec{x}}^i, \quad (10)$$

or $$\sum_{i=1}^{n} \frac{\hat{\alpha}_{\vec{x}}^j}{\hat{\theta}^2} \leq \sigma_{\vec{x}}^{i,2}$$

for i=1, 2, . . . , n.

In brief, the location data from each of the positioning receivers and estimated location data from the predictive module and/or adaptive module are represented in Gaussian distribution. The use of the Lagrange multiplier, deriving at equation 10 is to show that the errors of the final calculated position would be smaller than the original positioning data received from each of the positioning receivers. Hence, better accuracy of location data is obtained.

As an illustration, FIGS. 6a-6d show the positioning data from multiple positioning receivers, represented as Gaussian distribution and the final location after the statistical model was applied.

Figure 6A:
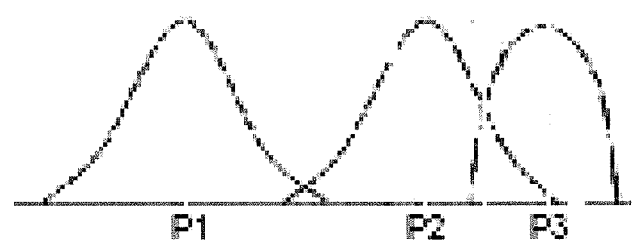
FIG. 6a illustrating location data being represented by Gaussian curve in accordance with an embodiment of this invention.

FIG. 6a illustrates the positions of three location data, namely P1, P2 and P3.

Figure 6B:
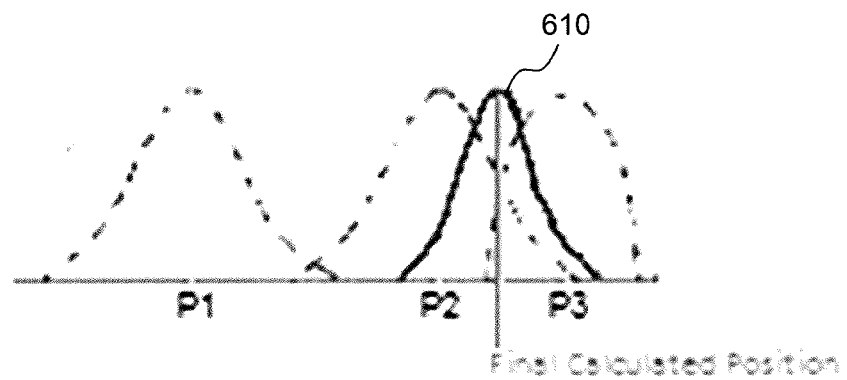
FIG. 6b illustrating a final location being determined in accordance with an embodiment of this invention.
Figure 6C:
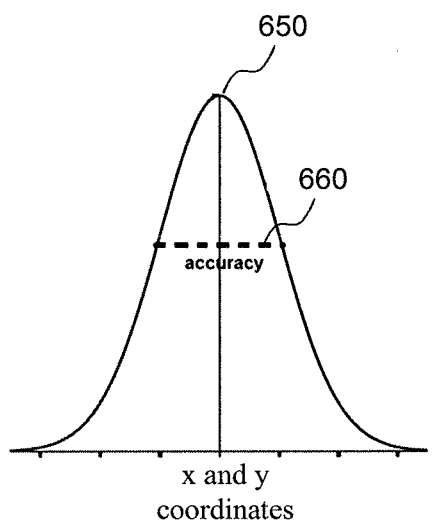
FIG. 6c illustrating the readings provided by a Gaussian curve in accordance with an embodiment of this invention.

The peak of the Gaussian curve provides the location while the width provides the accuracy of each of the location data. As shown, the accuracy varies from one system to another. FIG. 6b shows the accuracy of each of the location data is being used as a weightage to determine the final location as shown by the Gaussian curve 610. In particular, the final location 610 is between the left most and right most peaks. Based on the weightage of each of the location data, the final location 610 is adjusted accordingly. It is important to note that FIG. 6a shows the input's coordinates, i.e. longitude, latitude or altitude. FIG. 6c illustrates the information provided by a Gaussian curve. As shown in FIG. 6c, the peak 650 of the curve provides the latitude (x) and longitude (y) while the width 660 provides the accuracy of the curve. Although FIGS. 6a and 6b illustrate the location data for latitude and longitude, one skilled in the art will recognise that altitude may also be included to provide calculation in three dimensions without departing from the invention.

Figure 6D:
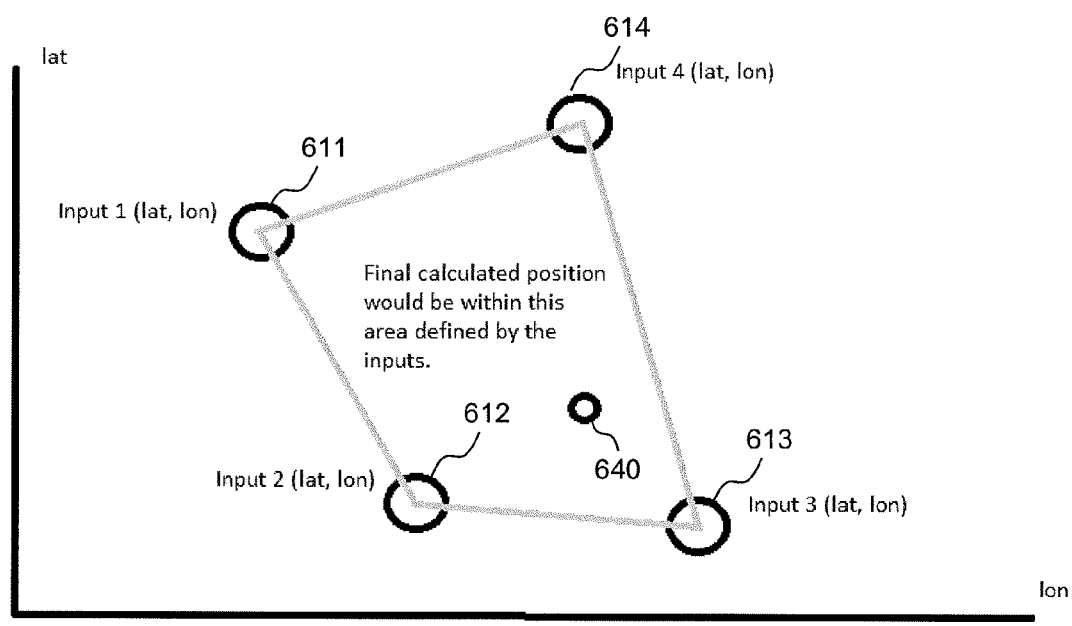
FIG. 6d illustrating a final location being determined based on four location data in accordance with an embodiment of this invention.

FIG. 6d illustrates the final location based on four location data, namely first location data 611, second data location 612, third location data 613 and fourth location data 614. The accuracy for all location data 611 to 614 are determined as per equations 1 to 5. Based on the accuracy for each of the location data, the final location 640 is determined, as per equation 8 and equations 9 and 10, through the abovementioned statistical model. This is shown by the amount of adjustment to the location within the area bounded by 611 to 614. Although FIG. 6d illustrates the location data for latitude and longitude, one skilled in the art will recognise that altitude may also be included to provide calculation in three dimensions without departing from the invention.

Figure 7:
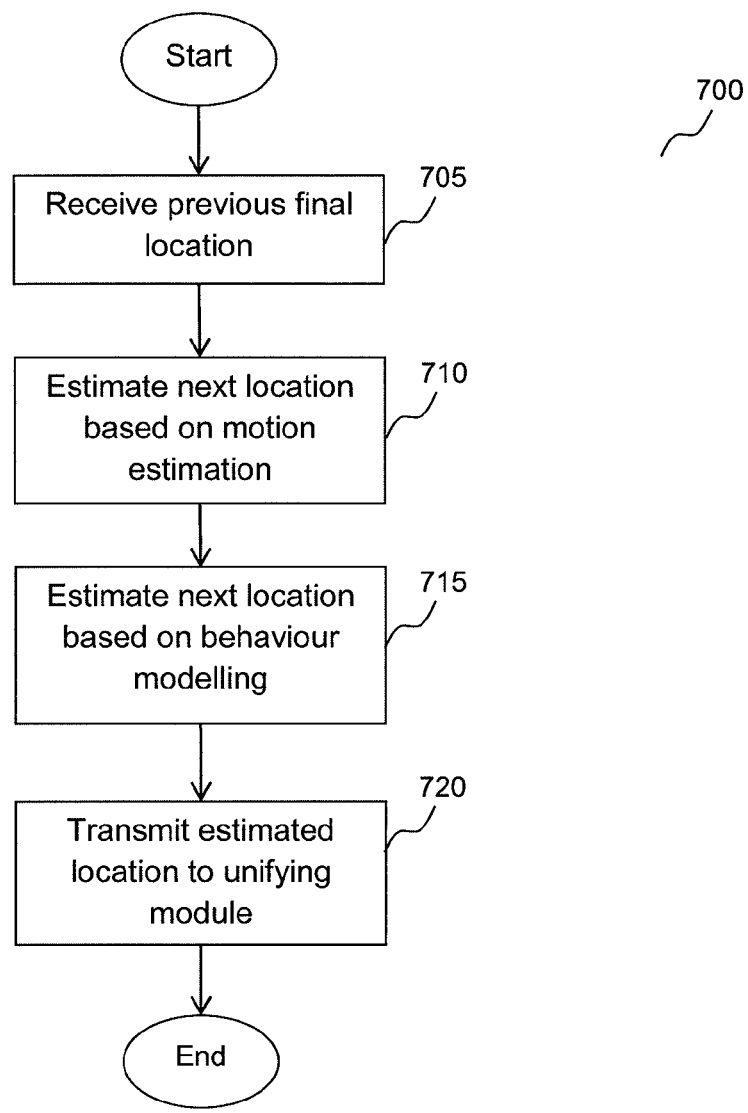
FIG. 7 illustrating a flow diagram of a process performed by the predictive module in accordance with an embodiment of this invention.

FIG. 7 illustrates a flow diagram of process 700 performed by the processor in processing unit 110 in accordance with an embodiment of this invention. Process 700 is a process being executed by the predictive module 320. Process 700 begins with step 705 by receiving a previous final location data.

In step 710, process 700 estimates the next location based on motion estimation. The motion estimation may be derived from devices such as a pedometer that provides the speed, and information from data storage 133. The information from data storage to be used includes information such as location data provided through the use of methods and systems described in Singapore Patent No. 120957 and Singapore Patent No. 144757, and application templates that map location to applications. Based on the information of the speed of travel of the subject, the previous final location, information from data storage 133 and the map, process 700 determines the estimated next location, assuming that the speed remains constant.

In step 715, process 700 estimates the next location based on behaviour modelling. The behaviour modelling is based on the historical location information stored in the data storage 133. Such information can be route templates that map location data to default, repetitive or user preferred routes taken; location data provided through the use of methods and systems described in Singapore Patent No. 120957 and Singapore Patent No. 144757. In particular, the process searches the data storage 133 for historical repetition behaviour. In other words, the process determines if the subject has travelled a repetitive route that overlaps with the previous final location. If process finds a repetitive route that intercept with the previous final location, the process estimates the next location based on the repetitive route.

In step 720, the estimated next location determined in steps 710-715 are transmitted to the unifying module 310. Process 700 ends after step 720. One skilled in the art will recognise that any other method of determining the next location may be implemented without departing from the invention.

Adaptive Module

Figure 8:
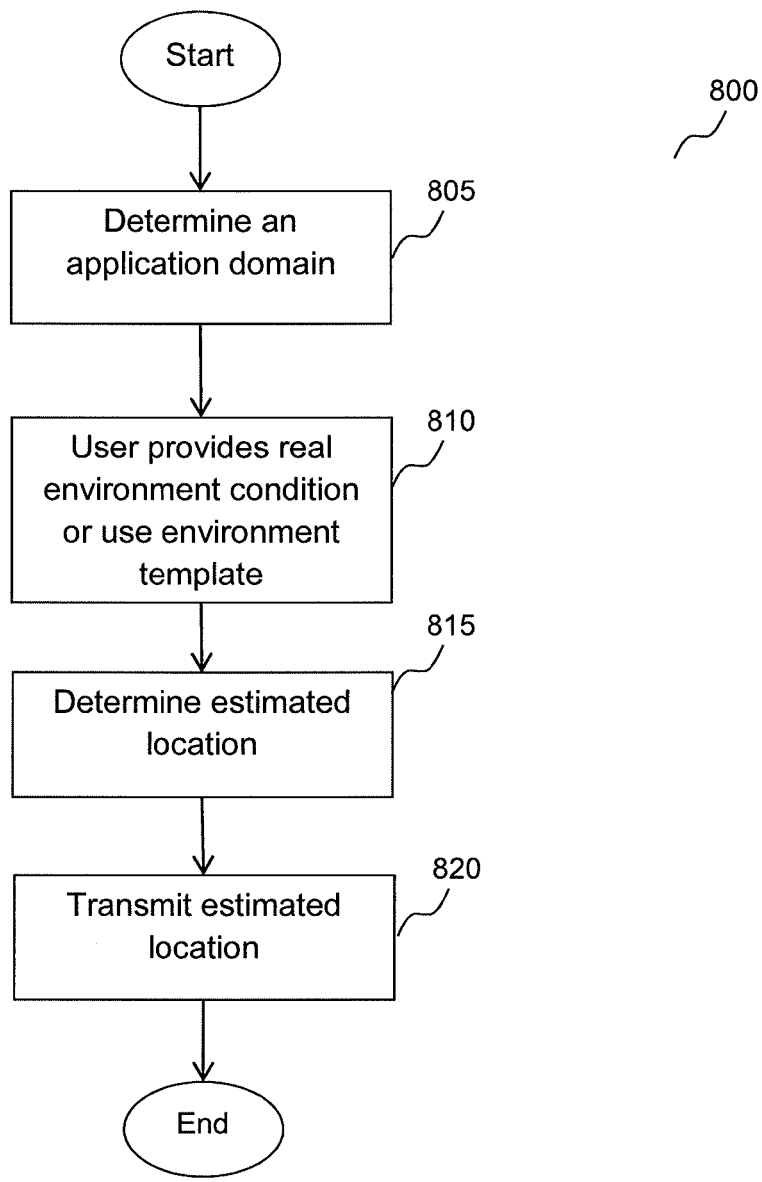
FIG. 8 illustrating a flow diagram of a process performed by the adaptive module in accordance with an embodiment of this invention.

FIG. 8 illustrates a flow diagram of process 800 performed by the processor in processing unit 110 in accordance with an embodiment of this invention. Process 800 is a process being executed by the adaptive module 330.

In step 805, process 800 enables user to define the application preference and used case. Alternatively process 800 may estimates the application domain. Tagging of different application domains will be used to differentiate various applications. The application domain of interest or operating application will be determined in the order of user defined, application selected, and lastly by information stored in data storage 133. Information such as the application templates that map location data to types of applications executed when such historical location information is obtained; the historical or real-time location data obtained from the methods and systems described in Singapore Patent No. 120957 and Singapore Patent No. 144757. The final selected or estimated application together with location data information and the map relating to the operating environment will be made available.

In step 810, process 800 estimates the operating terrain and environment condition. The environment condition to be used will be determined in the order of real environment condition provided by user if known, use of sensors to detect environment condition if available, and lastly by information stored in data storage 133. The types of sensors that may be used for detecting environment condition include temperature sensor, atomic timer, speedo meter, pedometer, direction-meter and Inclinometer etc. Information such as the environmental templates that map location data to information on environmental parameters such as enclose area (indoor), open area (outdoor); weather templates that map location data to weather condition (rain, clear sky, etc.); and the historical or real-time location data obtained from the methods and systems described in Singapore Patent No. 120957 and Singapore Patent No. 144757. The information of the terrain may be retrieved from mapping agency such as the Ordnance Survey for which the survey could be stored and regularly updated on the data storage 133. The information of the environment may be retrieved from historical data stored on the data storage 133 if real time data is not available. One skilled in the art will recognise that there are many known methods of estimating the terrain and environment. Hence, other known methods of estimating terrain and environment may be implemented without departing from the invention.

In step 815, process 800 will use the application selected from step 805, environment condition obtained from step 810, compare with historical location data from data storage 133 and if real application and environment condition information is known, update the application template and environment template in data storage 133. An estimated next location data (i.e. longitude, latitude and altitude) which best match both information from application template and environment template in data storage 313 will be used. The matching methodology used is based on error probability estimation on the mean for set of values obtained through a period of time defined by user.

In step 820, process 800 will transmit the estimated next location data (i.e. longitude, latitude and altitude) to the unifying module. Process 800 ends after step 820.

Figure 9:
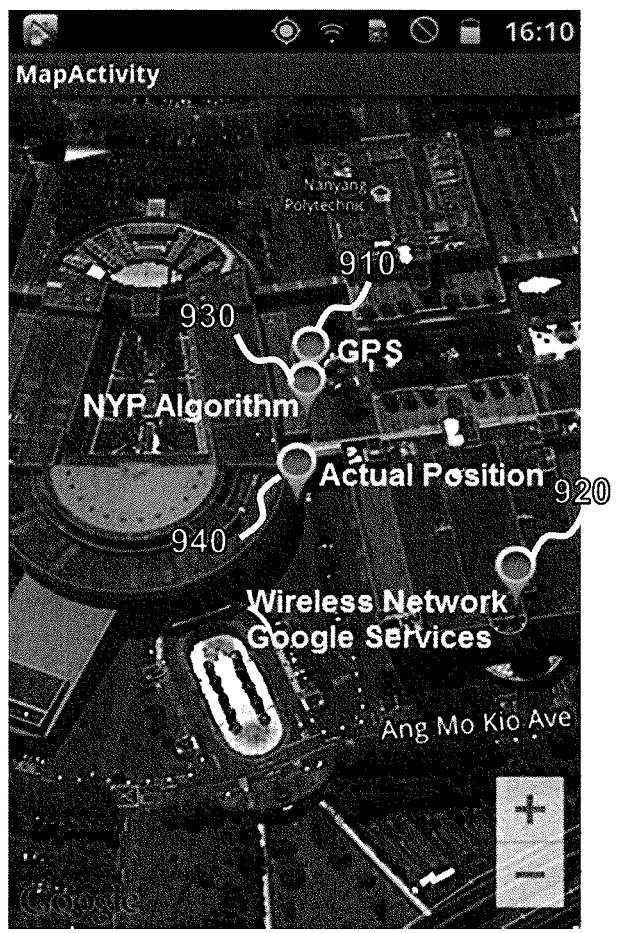
FIG. 9 illustrating a test result derived in accordance with an embodiment of this invention.

A mobile application was provided to demonstrate the invention. It makes use of just 2 positioning receivers, namely, GPS and wireless network Google Location service (WiFi). A screen shot from our mobile application is as shown in FIG. 9. As shown in FIG. 9, the location of the GPS 910 and the location of the Wifi 920 are not at the actual position 940. By combining the location data of GPS and Wifi via the statistical model implemented by the invention, a more accurate position 930 is provided. Hence, it can be seen that the invention combines the result obtained from both GPS and Wireless Network Google Services to yield an optimal result.

The above is a description of exemplary embodiments of a navigation system in accordance with this invention. It is foreseeable that those skilled in the art can and will design alternative systems based on this disclosure that infringe upon this invention as set forth in the following claims.

The invention claimed is:

1. A navigation system for integrating a plurality of positioning receivers to obtain a final position of a positioning device comprising the plurality of positioning receivers, the navigation system comprising:

an operation and control module; and
a unifying module,
said operation and control module being configured to receive a location data from each of said plurality of positioning receivers;
said unifying module, in response to receiving said location data of said plurality of positioning receivers from said operation and control module, is configured to:
normalize said location data of each of said plurality of positioning receivers;
determine an accuracy for each of said plurality of positioning receivers based on said location data of each of said plurality of positioning receivers with the following expression, $$\text{Acc}(X_{\vec{x},p}^i) = \sigma_{\vec{x}}^i$$

where p=1, 2, 3, $\vec{x}=(x_1, x_2, x_3)$ is the latitude, longitude and altitude of a point, $X_{\vec{x}}^i = (X_{\vec{x},1}^i, X_{\vec{x},2}^i, X_{\vec{x},3}^i)$ is the latitude, longitude and altitude by the i$^{th}$ positioning receiver and $\sigma_{\vec{x}}^i$ is the accuracy for respective positioning receivers, $\text{Acc}(X_{\vec{x},p}^i)$;
apply a normal distribution for each of said location data with the following expression to represent the location data in Gaussian distribution, $$X_{\vec{x},p} \sim N\left(x_{\vec{x},p}, \sqrt{\sum_{i=1}^{n} \frac{\hat{\alpha}_{\vec{x}}^i}{\hat{\theta}^2}}\right)$$

where $x_{\vec{x},1}, x_{\vec{x},2}, x_{\vec{x},3}$, are the calculated mean latitude, longitude and altitude, and $$\sqrt{\sum_{i=1}^{n} \frac{\hat{\alpha}_{\vec{x}}^i}{\hat{\theta}^2}}$$

is the width of the distribution for respective latitude, longitude and altitude,
determine said final position based on said accuracy of each of said location data with the following expression, $$\sum_{i=1}^{n} \frac{\hat{\alpha}_{\vec{x}}^i}{\hat{\theta}^2} \leq \sigma_{\vec{x}}^{i,2} \text{ for } i = 1, 2, \ldots, r, \hat{\alpha}_{\vec{x}}^i = \frac{1}{\sigma_{\vec{x}}^{i,2}}, \hat{\theta}^2 = \sum_{i=1}^{n} \hat{\alpha}_{\vec{x}}^i;$$

and
transmit said final location to said operation and control module;
said operation and control module is configured to display said final position on a display of said navigation system in response to receiving said final location from said unifying module.

2. The navigation system according to claim 1 wherein said operation and control module is further configured to:
receive a subsequent location data from each of said plurality of positioning receivers;
comparing said location data with said subsequent location data;
determining said navigation system is stationary in response to said location data and said subsequent location data having a displacement equal to or less than a pre-determined value; and
determining said navigation system is not stationary in response to said location data and said subsequent location data having a displacement more than said pre-determined value.

3. The navigation system according to claim 2 wherein said operation and control module is configured to display said final position on said display of said navigation system in response to determining said navigation system is stationary.

4. The navigation system according to claim 2 further comprising an adaptive module and a predictive module, wherein said operation and control module is configured to transmit said final location to said adaptive module and said predictive module in response to said navigation system being determined to not stationary.

5. The navigation system according to claim 4 wherein said predictive module determines a first estimated next location based on motion estimation.

6. The navigation system according to claim 5 wherein said predictive module determines a second estimated next location based on behaviour modelling.

7. The navigation system according to claim 6 wherein said adaptive module determines a third estimated next location based on terrain and environment condition.

8. The navigation system according to claim 7 wherein said predictive module transmits said first and second estimated next locations to said unifying module and said adaptive module transmits said third estimated next locations to said unifying module.

9. The navigation system according to claim 8, wherein said unifying module is configured to perform the following steps in response to receiving said subsequent location data of said plurality of positioning receivers from said operation and control module, said first and second estimated next location from said predictive module, and said third estimated location from said adaptive module:
normalising said location data of each of said plurality of positioning receivers, said first and second estimated next locations from said predictive module, and said third estimated location from said adaptive module;
determining an accuracy for each of said plurality of positioning receivers based on said location data of each of said plurality of positioning receivers, an accuracy for each of said first, second and third estimated next locations with the following expression, $$\text{Acc}(X_{\vec{x},p}^i) = \sigma_{\vec{x}}^i$$

where p=1, 2, 3, $\vec{x}=(x_1, x_2, x_3)$ is the latitude, longitude and altitude of a point, $X_{\vec{x}}^i = (X_{\vec{x},1}^i, X_{\vec{x},2}^i, X_{\vec{x},3}^i)$ is the latitude, longitude and altitude by the i$^{th}$ positioning receiver, first, second or third estimated location and $\sigma_{\vec{x}}^i$ is the accuracy for respective positioning receivers, $\text{Acc}(X_{\vec{x},p}^i)$;
applying a normal distribution for each of said subsequent location data, said first, second and third estimated locations with the following expression to represent each of said subsequent location data, said first, second and third estimated locations in Gaussian distribution, $$X_{\vec{x},p} \sim N\left(x_{\vec{x},p}, \sqrt{\sum_{i=1}^{n} \frac{\hat{\alpha}_{\vec{x}}^i}{\hat{\theta}^2}}\right)$$

where, $x_{\vec{x},1}$, $x_{\vec{x},2}$, $x_{\vec{x},3}$, are the calculated mean latitude, longitude and altitude, and $$\sqrt{\sum_{i=1}^{n} \frac{\hat{\alpha}_{\vec{x}}^{i}}{\hat{\theta}^{2}}}$$

is the width of the distribution for respective latitude, longitude and altitude, determining an updated final position based on said accuracy of each of said location data, said first, second and third estimated locations with the following expression, $$\sum_{i=1}^{n} \frac{\hat{\alpha}_{\vec{x}}^{i}}{\hat{\theta}^{2}} \leq \sigma_{\vec{x}}^{i,2} \text{ for } i=1, 2, \ldots, r, \hat{\alpha}_{\vec{x}}^{i} = \frac{1}{\sigma_{\vec{x}}^{i,2}}, \hat{\theta}^{2} = \sum_{i=1}^{n} \hat{\alpha}_{\vec{x}}^{i};$$

and transmitting said updated final location to said operation and control module; and said operation and control module configured to display said updated final position on said display of said navigation system in response to receiving said updated final location from said unifying module.

10. A method for integrating a plurality of positioning receivers to obtain a final position on a navigation system comprising a processor preforming the steps of:

receiving a location data from each of said plurality of positioning receivers;

normalising said location data of each of said plurality of positioning receivers;

determining an accuracy for each of said plurality of positioning receivers based on said location data of each of said plurality of positioning receivers with the following expression, $\text{Acc}(X_{\vec{x},p}^{i}) = \sigma_{\vec{x}}^{i}$ where p=1, 2, 3, $\vec{x}=(x_1, x_2, x_3)$ is the latitude, longitude and altitude of a point, $X_{\vec{x}}^{i}=(X_{\vec{x},1}^{i}, X_{\vec{x},2}^{i}, X_{\vec{x},3}^{i})$ is the latitude, longitude and altitude by the $i^{th}$ positioning receiver and $\sigma_{\vec{x}}^{i}$ is the accuracy for respective positioning receivers, $\text{Acc}(X_{\vec{x},p}^{i})$;

applying a normal distribution for each of said location data with the following expression to represent said location data in Gaussian distribution, $$X_{\vec{x},p} \sim N\left(x_{\vec{x},p}, \sqrt{\sum_{i=1}^{n} \frac{\hat{\alpha}_{\vec{x}}^{i}}{\hat{\theta}^{2}}}\right)$$

where, $x_{\vec{x},1}$, $x_{\vec{x},2}$, $x_{\vec{x},3}$, are the calculated mean latitude, longitude and altitude, and $$\sqrt{\sum_{i=1}^{n} \frac{\hat{\alpha}_{\vec{x}}^{i}}{\hat{\theta}^{2}}}$$

is the width of the distribution for respective latitude, longitude and altitude, determining said final position based on said accuracy of each of said location data with the following expression, $$\sum_{i=1}^{n} \frac{\hat{\alpha}_{\vec{x}}^{i}}{\hat{\theta}^{2}} \leq \sigma_{\vec{x}}^{i,2} \text{ for } i=1, 2, \ldots, r, \hat{\alpha}_{\vec{x}}^{i} = \frac{1}{\sigma_{\vec{x}}^{i,2}}, \hat{\theta}^{2} = \sum_{i=1}^{n} \hat{\alpha}_{\vec{x}}^{i};$$

wherein the determining said final position uses Lagrange multiplier to minimize error of the final position relative to the received location data to obtain accuracy of location data; and displaying said final position on a display of said navigation system.

11. The method according to claim 10 further comprising:

receiving a subsequent location data from each of said plurality of positioning receivers;

comparing said location data with said subsequent location data;

determining said navigation system is stationary in response to said location data and said subsequent location data having a displacement equal to or less than a pre-determined value; and determining said navigation system is not stationary in response to said location data and said subsequent location data having a displacement more than said pre-determined value.

12. The method according to claim 11 further comprising:

repeating the step of displaying said final position on a display of said navigation system in response to determining said navigation system is stationary.

13. The method according to claim 11 further comprising:

determining a first estimated next location based on motion estimation in response to said navigation system is not stationary, said motion estimation comprises the following steps:

retrieving the speed of travel of the navigation system; and estimating said first estimated next location based on said speed of travel and said final position.

14. The method according to claim 13 further comprising:

determining a second estimated next location based on behaviour modelling in response to said navigation system is not stationary, said behaviour modelling comprises the following steps:

retrieving a plurality of repetitive routes stored on a data storage of said navigation system;

comparing each of said plurality repetitive routes retrieved with said final position;

determining one of said plurality of repetitive routes in response to said one of said repetitive routes overlaps with said final position; and estimating said second estimated next location based on said determined repetitive route.

15. The method according to claim 14 further comprising:

normalising said subsequent location data of each of said plurality of positioning receivers, said first and second estimated next locations;

determining an accuracy for each of said plurality of positioning receivers based on said location data of each of said plurality of positioning receivers, an accuracy for each of said first and second estimated next locations with the following expression, $$Acc(X_{\vec{x},p}^i) = \sigma_{\vec{x}}^i$$

where p=1, 2, 3, $\vec{x}=(x_1, x_2, x_3)$ is the latitude, longitude and altitude of a point, $X_{\vec{x}}^i = (X_{\vec{x},1}^i, X_{\vec{x},2}^i, X_{\vec{x},3}^i)$ is the latitude, longitude and altitude by the $i^{th}$ positioning receiver, first, or second estimated location and $\sigma_{\vec{x}}^i$ is the accuracy for respective positioning receivers, $Acc(X_{\vec{x},p}^i)$;

applying a normal distribution for each of said subsequent location data, said first and second estimated locations with the following expression to represent each of said subsequent location data, said first and second estimated locations in Gaussian distribution, $$X_{\vec{x},p} \sim N\left(x_{\vec{x},p}, \sqrt{\sum_{i=1}^{n} \frac{\hat{\alpha}_{\vec{x}}^i}{\hat{\theta}^2}}\right)$$

where, $x_{\vec{x},1}^\rightarrow, x_{\vec{x},2}^\rightarrow, x_{\vec{x},3}^\rightarrow$, are the calculated mean latitude, longitude and altitude, and $$\sqrt{\sum_{i=1}^{n} \frac{\hat{\alpha}_{\vec{x}}^i}{\hat{\theta}^2}}$$

is the width of the distribution for respective latitude, longitude and altitude, determining an updated final position based on said accuracy of each of said location data, said first and second estimated locations with the following expression, $$\sum_{i=1}^{n} \frac{\hat{\alpha}_{\vec{x}}^i}{\hat{\theta}^2} \leq \sigma_{\vec{x}}^{i,2} \text{ for } i = 1, 2, \ldots, r, \hat{\alpha}_{\vec{x}}^i = \frac{1}{\sigma_{\vec{x}}^{i,2}}, \hat{\theta}^2 = \sum_{i=1}^{n} \hat{\alpha}_{\vec{x}}^i;$$

and displaying said updated final location on said display of said navigation system.

* * * * *